US012294752B2

(12) United States Patent
Bertolami et al.

(10) Patent No.: US 12,294,752 B2
(45) Date of Patent: *May 6, 2025

(54) METHODS, SYSTEMS, AND MEDIA FOR ADJUSTING QUALITY LEVEL DURING SYNCHRONIZED MEDIA CONTENT PLAYBACK ON MULTIPLE DEVICES

(71) Applicant: Google LLC, Mountain View, CA (US)

(72) Inventors: Joe Bertolami, Culver City, CA (US); Steven Pochapin, Pasadena, CA (US); Curtis May, Venice, CA (US); Benoit de Boursetty, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/216,751

(22) Filed: Jun. 30, 2023

(65) Prior Publication Data
US 2023/0345065 A1 Oct. 26, 2023

Related U.S. Application Data

(63) Continuation of application No. 17/717,248, filed on Apr. 11, 2022, now Pat. No. 11,695,974, which is a
(Continued)

(51) Int. Cl.
*G06F 15/16* (2006.01)
*H04L 65/60* (2022.01)
(Continued)

(52) U.S. Cl.
CPC .......... *H04N 21/242* (2013.01); *H04L 65/60* (2013.01); *H04N 21/23406* (2013.01); *H04N 21/2387* (2013.01)

(58) Field of Classification Search
None
See application file for complete search history.

(56) References Cited

U.S. PATENT DOCUMENTS

| 5,414,455 A | 5/1995 | Hooper et al. |
| 8,930,577 B2 | 1/2015 | Ostergren |

(Continued)

FOREIGN PATENT DOCUMENTS

| AU | 2007202654 | 3/2010 |
| CN | 102246523 | 11/2011 |

(Continued)

OTHER PUBLICATIONS

Examination Report dated Apr. 14, 2023 in EP Patent Application No. 18723329.1.
(Continued)

*Primary Examiner* — Phuoc H Nguyen
(74) *Attorney, Agent, or Firm* — Lowenstein Sandler LLP

(57) ABSTRACT

Methods, systems, and media for adjusting quality level during synchronized media content presentation are provided. In some embodiments, the method comprises: transmitting, from a server to a first user device, first media content data corresponding to a first stream of a media content item and from the server to a second user device, second media content data corresponding to a second stream of the media content item, wherein the first media content data is to be stored in a buffer of the first user device, and wherein the second media content data is to be stored in a buffer of the second user device; transmitting, from the server to the first user device and to the second user device, instructions that cause the first user device and the second user device to begin presenting the media content item simultaneously; determining, by the server, that the first media content data is being stored in the buffer of the first user device at a slower rate than the second media content data is being stored in the buffer of the second user device; in response to determining that the first media content data is being stored in the buffer of the first user device at a
(Continued)

slower rate than the second media content data is being stored in the buffer of the second user device, selecting a third stream of the media content item corresponding to the first stream of the media content item, wherein the third stream of the media content item has a lower quality level than the first stream of the media content item; and transmitting third media content data corresponding to the third stream of the media content item to the first user device.

21 Claims, 4 Drawing Sheets

Related U.S. Application Data continuation of application No. 16/976,628, filed as application No. PCT/US2018/029151 on Apr. 24, 2018, now Pat. No. 11,303,947.

(51) Int. Cl.
*H04N 21/234* (2011.01)
*H04N 21/2387* (2011.01)
*H04N 21/242* (2011.01)

(56) References Cited

U.S. PATENT DOCUMENTS

| | | | |
|---|---|---|---|
| 9,794,601 | B2 | 10/2017 | Li et al. |
| 10,491,711 | B2 | 11/2019 | Hancock et al. |
| 10,680,911 | B2 | 6/2020 | Ramakrishnan et al. |
| 2007/0168413 | A1 | 7/2007 | Barletta et al. |
| 2008/0109865 | A1 | 5/2008 | Su et al. |
| 2008/0195744 | A1 | 8/2008 | Bowra et al. |
| 2009/0164652 | A1* | 6/2009 | Slobotskoy ........ H04N 21/2343 709/231 |
| 2009/0249222 | A1* | 10/2009 | Schmidt ............ H04N 21/4143 713/400 |
| 2012/0254457 | A1 | 10/2012 | Condon et al. |
| 2013/0047074 | A1 | 2/2013 | Vestergaard et al. |
| 2013/0173742 | A1 | 7/2013 | Thomas et al. |
| 2013/0227081 | A1 | 8/2013 | Luby et al. |
| 2013/0251329 | A1 | 9/2013 | McCoy et al. |
| 2014/0130110 | A1 | 5/2014 | Gilson |
| 2014/0143439 | A1* | 5/2014 | Ramamurthy ... H04N 21/25808 709/231 |
| 2016/0028647 | A1 | 1/2016 | Ramakrishnan et al. |
| 2020/0145701 | A1 | 5/2020 | Liu et al. |

FOREIGN PATENT DOCUMENTS

| | | |
|---|---|---|
| CN | 103281289 | 9/2013 |
| CN | 104823176 | 8/2015 |
| CN | 107710771 | 2/2018 |
| JP | 2005294941 | 10/2005 |
| KR | 20130061171 | 6/2013 |
| WO | WO 2009097230 | 8/2009 |

OTHER PUBLICATIONS

Examination Report dated Jun. 8, 2021 in EP Patent Application No. 18723329.1.
Examination Report dated Sep. 15, 2021 in IN Patent Application No. 202047038477.
International Search Report and Written Opinion dated Nov. 15, 2018 in International Patent Application No. PCT/US2018/029151.
Notice of Allowance dated Feb. 6, 2023 in U.S. Appl. No. 17/717,248.
Notice of Allowance dated Mar. 23, 2021 in KR Patent Application No. 10-2020-7026334.
Notice of Allowance dated Dec. 8, 2021 in U.S. Appl. No. 16/976,628.
Notice of Grant dated Jun. 15, 2022 in CN Patent Application No. 201880091069.6.
Office Action dated Apr. 12, 2021 in U.S. Appl. No. 16/976,628.
Office Action dated Sep. 16, 2022 in U.S. Appl. No. 17/717,248.
Office Action dated Nov. 25, 2020 in KR Patent Application No. 10-2020-7026334.
Office Action dated Dec. 2, 2021 in CN Patent Application No. 201880091069.6.
Office Action dated Dec. 23, 2020 in U.S. Appl. No. 16/976,628.
Poff, Zach, "MultiScreener Guide," last accessed Aug. 14, 2020, pp. 1-8, available at https://www.zachpoff.com/software/multiscreener-guide/.

* cited by examiner

METHODS, SYSTEMS, AND MEDIA FOR ADJUSTING QUALITY LEVEL DURING SYNCHRONIZED MEDIA CONTENT PLAYBACK ON MULTIPLE DEVICES

CROSS-REFERENCE TO RELATED APPLICATIONS

This application is a continuation of U.S. patent application Ser. No. 17/717,248, filed Apr. 11, 2022, which is a continuation of U.S. patent application Ser. No. 16/976,628, filed Aug. 28, 2020, which is the national stage application under 35 U.S.C. § 371 of International Patent Application No. PCT/US2018/029151, filed Apr. 24, 2018, each of which is hereby incorporated by reference herein in its entirety.

TECHNICAL FIELD

The disclosed subject matter relates to methods, systems, and media for adjusting quality level during synchronized media content playback on multiple devices.

BACKGROUND

People frequently watch media content, such as videos, downloaded or streamed from a server, such as a server associated with a video sharing service. Additionally, people may want to watch media content with other people, such as friends, simultaneously, but on separate devices. It can, however, be difficult to synchronize playback of media content across multiple devices. For example, multiple devices can each buffer media content prior to and during playback of a media content item, however, each device may buffer the media content at a different rate. In some cases, this may cause a device that is buffering media content more slowly than other devices to have to pause playback to buffer additional media content prior to resuming playback, which can cause the devices to lose synchrony during playback.

Accordingly, it is desirable to provide new methods, systems, and media for adjusting quality level during synchronized media content playback on multiple devices.

SUMMARY

Methods, systems, and media for adjusting quality level during synchronized media content playback on multiple devices are provided.

In accordance with some embodiments of the disclosed subject matter, a method for synchronizing playback of media content is provided, the method comprising: transmitting, from a server to a first user device, first media content data corresponding to a first stream of a media content item and from the server to a second user device, second media content data corresponding to a second stream of the media content item, wherein the first media content data is to be stored in a buffer of the first user device, and wherein the second media content data is to be stored in a buffer of the second user device; transmitting, from the server to the first user device and to the second user device, instructions that cause the first user device and the second user device to begin presenting the media content item simultaneously; determining, by the server, that the first media content data is being stored in the buffer of the first user device at a slower rate than the second media content data is being stored in the buffer of the second user device; in response to determining that the first media content data is being stored in the buffer of the first user device at a slower rate than the second media content data is being stored in the buffer of the second user device, selecting a third stream of the media content item corresponding to the first stream of the media content item, wherein the third stream of the media content item has a lower quality level than the first stream of the media content item; and transmitting third media content data corresponding to the third stream of the media content item to the first user device.

In some embodiments, the instructions that cause the first user device and the second user device to begin presenting the media content item simultaneously are based on a determination that the first user device and the second user device have buffered a predetermined amount of the media content data corresponding to the media content item.

In some embodiments, determining that the first media content data is being stored in the buffer of the first user device at a slower rate than the second media content data is being stored in the buffer of the second user device is based on a message received by the server from the first user device.

In some embodiments, the message indicates a current amount of the first media content data stored in the buffer of the first user device at a time at which the message is transmitted to the server by the first user device.

In some embodiments, determining that the first media content data is being stored in the buffer of the first user device at a slower rate than the second media content data is being stored in the buffer of the second user device is based on a comparison of an amount of the first media content data stored in the buffer of the first user device and an amount of the second media content data stored in the buffer of the second user device.

In some embodiments, the third stream of the media content item has a lower bitrate than the first stream of the media content item.

In accordance with some embodiments of the disclosed subject matter, a system for synchronizing playback of media content is provided, the system comprising a memory and a hardware processor that, when executing computer executable instructions stored in the memory, is configured to: transmit, from a server to a first user device, first media content data corresponding to a first stream of a media content item and from the server to a second user device, second media content data corresponding to a second stream of the media content item, wherein the first media content data is to be stored in a buffer of the first user device, and wherein the second media content data is to be stored in a buffer of the second user device; transmit, from the server to the first user device and to the second user device, instructions that cause the first user device and the second user device to begin presenting the media content item simultaneously; determine, by the server, that the first media content data is being stored in the buffer of the first user device at a slower rate than the second media content data is being stored in the buffer of the second user device; in response to determining that the first media content data is being stored in the buffer of the first user device at a slower rate than the second media content data is being stored in the buffer of the second user device, select a third stream of the media content item corresponding to the first stream of the media content item, wherein the third stream of the media content item has a lower quality level than the first stream of the media content item; and transmit third media content data corresponding to the third stream of the media content item to the first user device. Another embodiment of the disclosed subject matter provides a system for synchronizing playback of media content, the system comprising a memory and a hardware processor that, when executing computer executable instructions stored in the memory, is configured to perform a method according to any aspect or embodiment described herein.

In accordance with some embodiments of the disclosed subject matter, a non-transitory computer-readable medium containing computer executable instructions that, when executed by a processor, cause the processor to perform a method for synchronizing playback of media content is provided, the method comprising: transmitting, from a server to a first user device, first media content data corresponding to a first stream of a media content item and from the server to a second user device, second media content data corresponding to a second stream of the media content item, wherein the first media content data is to be stored in a buffer of the first user device, and wherein the second media content data is to be stored in a buffer of the second user device; transmitting, from the server to the first user device and to the second user device, instructions that cause the first user device and the second user device to begin presenting the media content item simultaneously; determining, by the server, that the first media content data is being stored in the buffer of the first user device at a slower rate than the second media content data is being stored in the buffer of the second user device; in response to determining that the first media content data is being stored in the buffer of the first user device at a slower rate than the second media content data is being stored in the buffer of the second user device, selecting a third stream of the media content item corresponding to the first stream of the media content item, wherein the third stream of the media content item has a lower quality level than the first stream of the media content item; and transmitting third media content data corresponding to the third stream of the media content item to the first user device. Another embodiment of the disclosed subject matter provides a computer-readable medium (which may be a transitory or non-transitory medium) containing computer executable instructions that, when executed by a processor, cause the processor to perform a method according to any aspect or embodiment described herein.

In accordance with some embodiments of the disclosed subject matter, a system for synchronizing playback of media content is provided, the system comprising: means for transmitting, from a server to a first user device, first media content data corresponding to a first stream of a media content item and from the server to a second user device, second media content data corresponding to a second stream of the media content item, wherein the first media content data is to be stored in a buffer of the first user device, and wherein the second media content data is to be stored in a buffer of the second user device; means for transmitting, from the server to the first user device and to the second user device, instructions that cause the first user device and the second user device to begin presenting the media content item simultaneously; means for determining, by the server, that the first media content data is being stored in the buffer of the first user device at a slower rate than the second media content data is being stored in the buffer of the second user device; means for selecting a third stream of the media content item corresponding to the first stream of the media content item in response to determining that the first media content data is being stored in the buffer of the first user device at a slower rate than the second media content data is being stored in the buffer of the second user device, wherein the third stream of the media content item has a lower quality level than the first stream of the media content item; and means for transmitting third media content data corresponding to the third stream of the media content item to the first user device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
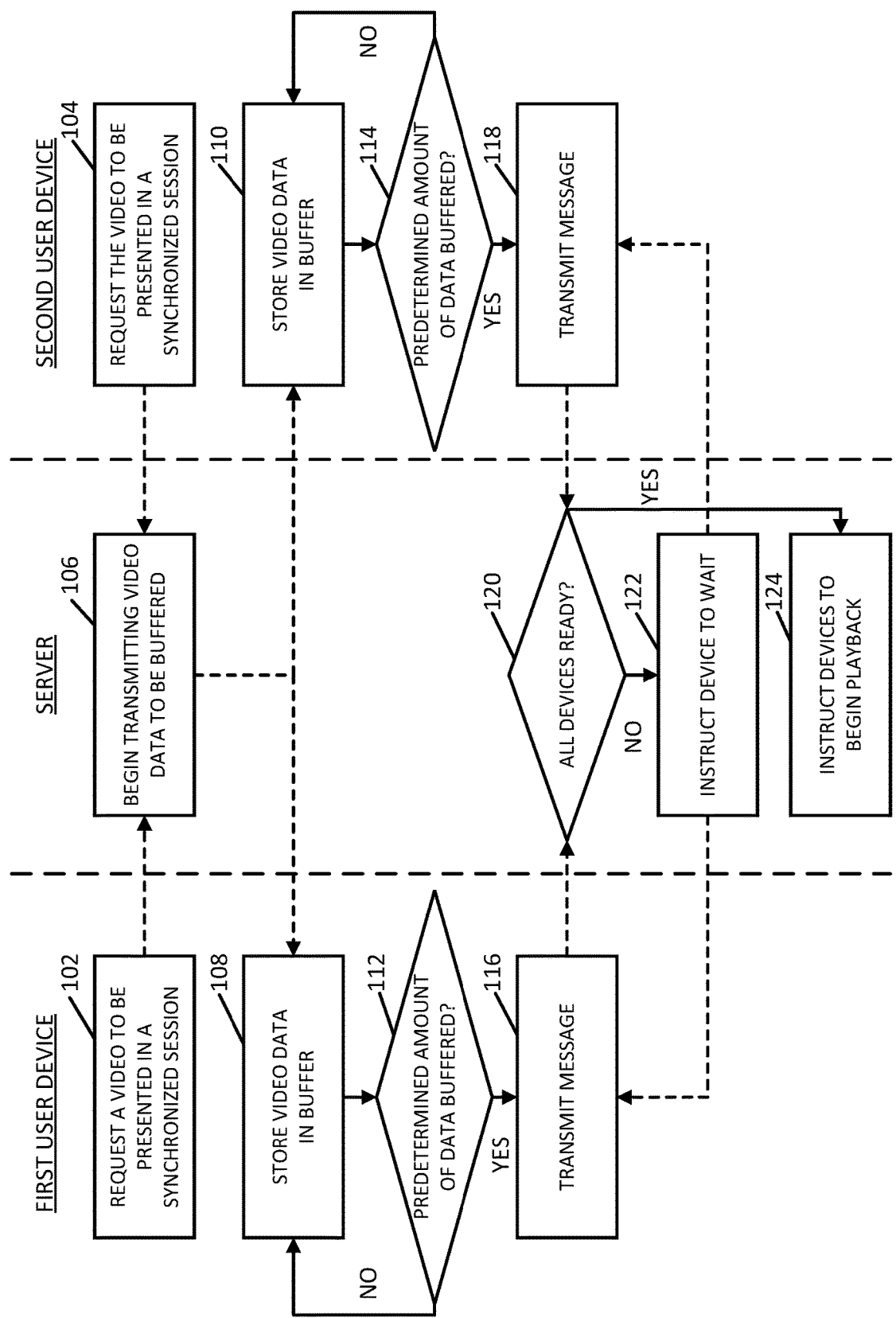
FIG. 1 shows an example of an information flow diagram for synchronized media content playback on multiple devices in accordance with some embodiments of the disclosed subject matter.

In accordance with various embodiments, mechanisms (which can include methods, systems, and media) for adjusting quality level during synchronized media content playback on multiple devices are provided.

In some embodiments, the mechanisms described herein can synchronize playback of a media content item across multiple user devices. For example, in some embodiments, the mechanisms can cause the media content item to be presented simultaneously on multiple user devices such that each user device is at the same playback position of the media content item at the same time, to cause a "synchronized presentation" of the media content item to each of the user devices. In some embodiments, the mechanisms can cause a synchronized presentation of the media content item to be maintained during streaming of the media content item to each of the user devices. For example, in some embodiments, the mechanisms can cause the synchronized presentation of the media content item to be maintained across the user devices in an instance where one user device of the multiple user devices buffers media content data corresponding to the streamed media content item at a slower rate than other user devices. As a more particular example, in some embodiments, the mechanisms can cause the user device that is buffering media content data at a slower rate to present the media content item at a lower quality level. As another example, in some embodiments, the mechanisms can cause the synchronized presentation of the media content item to be maintained across the user devices in an instance where one user device of the multiple user devices pauses playback of the media content item to buffer additional media content data. As a more particular example, in some embodiments, the mechanisms can cause the user device to resume playback (that is, once the additional media content data has been buffered) at an increased playback speed until playback on the user device has caught up to playback on the other user devices.

It should be noted that, in some embodiments, the mechanisms described herein can synchronize playback of a media content item across multiple user devices that is presented in a synchronized media playback session. In some embodiments, a synchronized media playback session across multiple user devices can include any suitable features or combination of features. For example, in some embodiments, a synchronized media playback session can allow each user device of the multiple user devices to simultaneously present a particular media content item, as described above. As another example, in some embodiments, a synchronized media playback session can allow a series of media content items (e.g., a playlist of media content items, and/or any other suitable collection of media content items) to be simultaneously presented on each user device of the multiple user devices. As yet another example, in some embodiments, a synchronized media playback session can allow a user device participating in the synchronized media playback session to select a video, pause a video, and/or switch to a different video, and can cause the action performed by the user device to be mirrored on the other user devices participating in the session without the user device needing to send commands to each other user device separately.

In some embodiments, the mechanisms described herein can adjust a quality of a stream transmitting to one or more of multiple user devices participating in the synchronized media playback session to ensure that all devices in the session maintain a synchronized viewing experience. In particular, in some embodiments, a server transmitting streams of media content corresponding to a media content item that is synchronously presented on each of the user devices participating in the session can determine a rate or respective rates at which each user device is buffering the stream. In some embodiments, the server can then adjust a quality of the stream for one of the user devices based on the buffering rate for the user device. For example, in some embodiments, in response to determining that a user device is buffering the stream more slowly than other user devices participating in the synchronized media playback session, the server can transmit a lower quality stream, thereby allowing the user device to fill the buffer of the user device at the same rate as the other user devices in the session. In some embodiments, the mechanisms described herein can additionally or alternatively employ any other suitable techniques for maintaining synchrony of playback of media content across multiple user devices, such as adjusting a playback rate on a user device of the multiple user devices to allow the user device to catch up or slow down to other user devices.

By adjusting a quality of the stream of media content based on both the quality of the network connection between the server and a first user device as well as the quality of the network connections between the server and other user devices participating in a synchronized media playback session, the mechanisms described herein can be used to ensure both that all user devices in the session remain synchronized during the session (or that synchrony can be quickly reestablished), and that the user devices avoid having to pause playback to buffer additional data. In particular, by adjusting a quality of a stream of media content (e.g., lowering a quality level in response to determining that a network connection between a server and a user device is poor), the mechanisms can allow the user device to maintain a particular amount of media content data in a buffer and/or quickly fill a buffer to have a particular amount of media content data. Also, the mechanisms described herein can be used to improve an experience of a user while viewing streamed media content, particularly when viewing streamed media content in a synchronized media playback session, by preventing the user device from pausing playback to buffer additional media content data.

In conventional video streaming, a content server providing the streamed video provides rate control so that the streamed video is delivered to a user device at a rate and quality that the user device can handle. To allow this, the user device may provide the content server with information about parameters such as how quickly the user device can decode and process the received video, the bandwidth and/or latency of the network over which the video is being streamed to the user device, and the quality of the received video. The content server may adjust the rate of delivery of the video to the client device based on the information received from the client device. Aspects of the present disclosure provide coordinated rate control during streaming of a video content item to multiple client devices. The rate control is "coordinated" in that the rate of streaming to one particular user device is determined based on information supplied to the content server by at least one other user device as well as the particular user device concerned. This may provide improved delivery of the video to the multiple user devices. In many cases, a server that is providing content for delivery to multiple user devices (known as "co-watching") will use a third-party streaming platform, and has no control over the rate (or respective rates) at which the content is streamed to the multiple user devices. Moreover, even if the conventional rate control techniques can be applied to streaming of content to multiple user devices these techniques will apply independent rate control to each client device. This can lead to user devices having to pause playback in order to re-buffer, experiencing additional synchronization delays, and/or experiencing lower video quality than could be provided.

Additionally, as noted above, in some embodiments, a synchronized media playback session can allow a user device participating in the synchronized media playback session to select a video, pause a video, and/or switch to a different video, and can cause the action performed by the user device to be mirrored on the other user devices participating in the session. This may be achieved without the user device needing communicate with each other user device separately-when the particular user device informs the content server that it has selected a video, paused a video, and/or switched to a different video, the content server may adjust the delivery of streamed content to all other user device in the same way.

Turning to FIG. 1, an example 100 of an information flow diagram for initiating a synchronized media playback session and presenting synchronized media content on multiple devices is shown in accordance with some embodiments of the disclosed subject matter. As illustrated, in some embodiments, blocks of process 100 can be performed on a first user device, a second user device, and a server. Note that, although the information flow diagram shown in FIG. 1 and described below generally describes synchronized presentation of a video, in some embodiments, the techniques described below can be used to present any suitable type of media content (e.g., a video, a movie, a television program, live-streamed video content, live-streamed audio content, music, an audiobook, and/or any other suitable type of media content). Note also that, although the information flow diagram shown in FIG. 1 includes a first user device and a second user device, this is merely illustrative. Any suitable number of user devices can participate in a synchronized media playback session.

At 102, the first user device can request a video to be presented in a synchronized playback session from the server. In some embodiments, the request can be initiated on the first user device in any suitable manner. For example, in some embodiments, the request can be initiated in response to a user of the first user device selecting a link to a particular media content item, in response to a user of the first user device selecting a link to initiate a synchronized media playback session of a particular media content item in connection with other user devices (e.g., the second user device), and/or in any other suitable manner. Note that, in some embodiments, a link to a synchronized media playback session can be created by any suitable user device, and can be shared with other user devices in any suitable manner. For example, in some embodiments, a link to a synchronized media playback session can be shared via a message (e.g., an instant message, a text message, an e-mail, a push notification, and/or in any other suitable manner). In another example, in some embodiments, a synchronized media playback session in which a video content item is played back can be created on a first user device, where a list of user accounts associated with other user devices are included as being permitted to join the synchronized media playback session.

Similarly, at 104, the second user device can request the video to be presented in the synchronized playback session from the server and/or can request to join the synchronized media playback session. Similarly to as described above in connection with block 102, in some embodiments, the second user device can request to join and/or initiate the synchronized media playback session through selection of a link, and/or in any other suitable manner. For example, the second user device can accept a request to join a synchronized playback session in which a video content item is to be played back. In another example, the second user device can launch an application and can select a playback session from a list of playback sessions in which video content items are being played back.

Note that, in some embodiments, a synchronized media playback session can be initiated between the first user device and the second user device (and/or any other suitable user devices) that does not yet include a video. In some such embodiments, the first user device and/or the second user device can select a video and/or a series of videos for presentation during the synchronized media playback session in any suitable manner. For example, in some embodiments, a user device can select a particular video from a group of available videos. As another example, in some embodiments, a user device can create a playlist of videos by selecting videos from a group of available videos and/or arranging the videos in an order of to be presented during the synchronized media playback session.

At 106, the server can begin transmitting video data corresponding to the requested video to the first user device and the second user device. In some embodiments, the server can transmit the video data to the first user device and the second user device in any suitable manner. For example, in some embodiments, the video data can be transmitted via a communication network, as shown in and described below in connection with FIG. 3.

At 108, the first user device can store the received video data in a buffer of the first user device. Similarly, at 110, the second user device can store the received video data in a buffer of the second user device.

At 112, the first user device can determine whether a predetermined amount of video data has been buffered. In some embodiments, the predetermined amount of video data can be any suitable amount of data. For example, in some embodiments, the predetermined amount of video data can correspond to a particular number of kilobytes of data, a particular duration of the video (e.g., five seconds, ten seconds, thirty seconds, two minutes, and/or any other duration of the video), and/or any other suitable amount of video data. Similarly, at 114, the second user device can determine whether the predetermined amount of video data has been buffered on the second user device. Note that, in some embodiments, the first user device and the second user device can each determine whether the same predetermined amount of video data has been buffered on each device.

If, at 112, the first user device determines that the predetermined amount of video data has not been buffered ("no" at 112), the first user device can loop back to 108 and can continue to store received video data in the buffer of the first user device. Similarly, if, at 114, the second user device determines that the predetermined amount of video data has not been buffered ("no" at 114), the second user device can loop back to 110 and can continue storing the received video data in the buffer of the second user device.

If, at 112, the first user device determines that the predetermined amount of video data has been buffered by the first user device ("yes" at 112), the first user device can proceed to 116 and can transmit a message to the server indicating that the first user device has buffered the predetermined amount of video. Similarly, if, at 114, the second user device determines that the predetermined amount of video has been buffered by the second user device ("yes" at 114), the second user device can proceed to 118 and can transmit a message to the server indicating that the second user device has buffered the predetermined amount of video. Note that, in some embodiments, any suitable information can be included in the messages transmitted by the first user device and the second user device, as described below in more detail in connection with FIG. 2.

At 120, the server can determine if all user devices included in the synchronized media playback session (e.g., the first user device and the second user device, in the example shown in FIG. 1) have buffered the predetermined amount of video data. For example, in some embodiments, the server can determine whether it has received messages indicating that the predetermined amount of video data have been buffered from all user devices included in the synchronized media playback session.

If, at 120, the server determines that a device included in the synchronized playback session has not yet buffered the predetermined amount of video data ("no" at 120), the server can transmit responses to any user devices that have transmitted messages indicating they have buffered the predetermined amount of video data at 122. In particular, the server can transmit a response that instructs user devices that have buffered the predetermined amount of video data to wait to begin playback of the video.

In such instances, in response to receiving a response from the server to wait to begin playback of the video, a user device can re-transmit the message that the predetermined amount of video data has been buffered to the server after any suitable delay. For example, in some embodiments, a user device can transmit the message to the server at any suitable frequency (e.g., once per second, twice per second, and/or any other suitable frequency). As a more particular example, in response to receiving a response from the server to wait to begin playback, the first user device can loop back to block 116. As another more particular example, in response to receiving a response from the server to wait to begin playback, the second user device can loop back to block 118. For example, in response to receiving an instruction from the server to wait to begin playback of the video, a user device can continue to store video data in the buffer of the user device (e.g., until the buffer has been filled to the capacity of the buffer).

Conversely, if, at 120, the server determines that all user devices included in the synchronized media playback session have buffered the predetermined amount of video data, the server can transmit instructions to all of the user devices to begin playback of the video at 124. For example, the server can transmit an instruction to all of the user devices in the synchronized media playback session to begin playback of the video. In another example, the server can transmit an instruction to all of the user devices in synchronized media playback session to being playback of the video at a particular clock time. In some embodiments, the server can continue transmitting video data corresponding to the video, and the user devices can continue buffering the received video data during playback of the video.

In some embodiments, the first user device and the second user device can cause the synchronized playback session to begin in any suitable manner. For example, in some embodiments, presentation of the video can begin in any suitable type of video player window. In some embodiments, any suitable indication of other user devices included in the synchronized playback session can be presented in connection with presentation of the video. For example, in some embodiments, usernames of users associated with other user devices included in the synchronized playback session and/or icons associated with users associated with other user devices included in the synchronized playback session can be presented.

In some embodiments, a synchronized media playback session can allow a user device participating in the session to interact with presentation of media content in the session and/or with other user devices participating in the session in any suitable manner. For example, as described above, in some embodiments, a user device can cause playback of a media content item to be paused on all user devices participating in the session. As another example, in some embodiments, a user device can cause playback of a media content item to jump or skip to a different playback position on all user devices. As yet another example, in some embodiments, a user device can cause a different media content item to begin being presented. As still another example, in some embodiments, a user device can transmit a message to be presented on all user devices presenting in the session, for example, as an instant message, as a message in a group chat, and/or in any other suitable manner.

Figure 2:
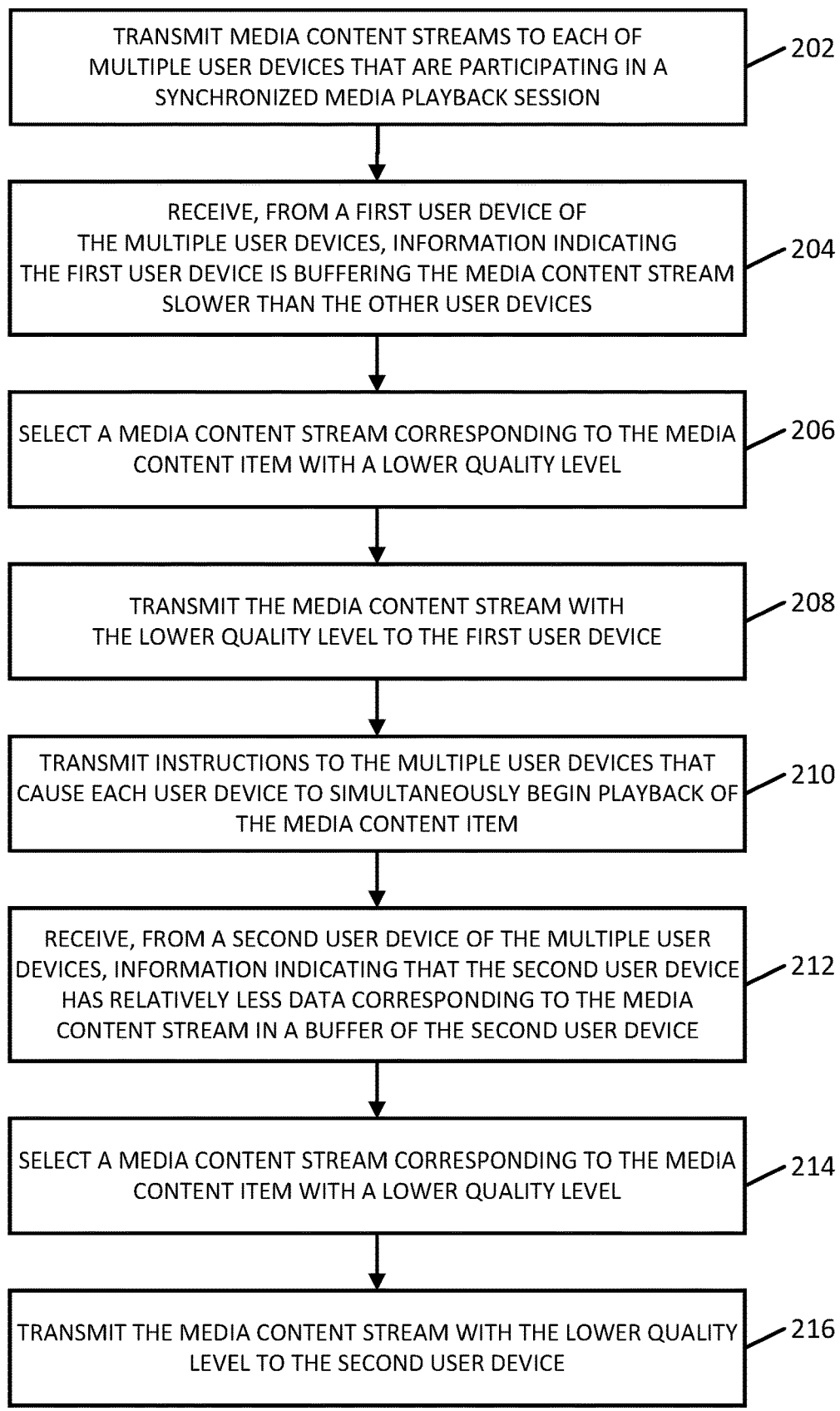
FIG. 2 shows an example of a process for adjusting quality level during synchronized media content playback on multiple devices in accordance with some embodiments of the disclosed subject matter.

Turning to FIG. 2, an example of a process 200 for adjusting stream content in a synchronized media playback session is shown in accordance with some embodiments of the disclosed subject matter. In some embodiments, blocks of process 200 can be implemented on a server, such as a server that stores media content and/or streams media content to user devices (e.g., server 302 as shown in and described below in connection with FIG. 3).

Process 200 can begin at 202 by transmitting media content streams to each of multiple user devices that are participating in a synchronized media playback session. Note that, as described above in connection with block 102 of FIG. 1, the synchronized media playback session can be initiated and/or joined on each user device participating in the session in any suitable manner, for example, through selection of a link. In some embodiments, the media content streams can correspond to any media content item that will be simultaneously presented on each of the multiple user devices during the synchronized media playback session. In some embodiments, the media content item can be selected by any user device, for example, a user device participating in the synchronized media playback session. Additionally or alternatively, in some embodiments, the media content item can be a media content item included in a playlist or other collection of media content items. In some embodiments, each user device of the user devices participating in the synchronized media playback session can store media content data corresponding to the received media content stream in a buffer of the user device, as described above in connection with blocks 108 and 110 of FIG. 1.

In some embodiments, process 200 can transmit the media content streams in any suitable manner. For example, in some embodiments, a server associated with process 200 (e.g., a server that stores media content and/or streams the media content to user devices, and/or any other suitable server) can transmit media content data associated with each media content stream to the user device using any suitable communication network (e.g., communication network 304, as shown in and described below in connection with FIG. 3).

At 204, process 200 can receive information from a first user device of the multiple user devices participating in the synchronized media playback session that indicates that the first user device is buffering media content data associated with the media content stream transmitted to the first user device at a slower rate than other user devices participating in the session are buffering media content data corresponding to media content streams transmitted to each of the other user devices. In some embodiments, the information from the first user device can be received in any suitable manner. For example, in some embodiments, as described above in connection with blocks 112-118 of FIG. 1, each user device can transmit a message to a server coordinating the synchronized media playback session when the user device has buffered a predetermined amount of media content data associated with the media content item to be presented in the session. In some such embodiments, process 200 can determine that the first user device is buffering the media content data at a slower rate than the other user devices based on information associated with the received messages. For example, in some embodiments, process 200 can determine that the first user device is buffering the media content data more slowly than the other user devices based on a timing of messages received from each of the user devices. As a more particular example, in some embodiments, process 200 can determine that the first user device is buffering the media content data more slowly than the other user devices based on determining that the first user device was the last of the user devices to finish buffering the predetermined amount of media content data. As another more particular example, in some embodiments, process 200 can determine that the first user device is buffering the media content data more slowly than the other user devices based on determining that process 200 has received messages from all user devices participating in the session other than the first user device, indicating that the first user device has not finished buffering the predetermined media content data.

As another example, in some embodiments, process 200 can determine that the first user device is buffering the media content data at a slower rate than the other user devices participating in the synchronized media playback session based on information included in a message received from the first user device. For example, in some embodiments, process 200 can receive a message from the first user device that indicates information about a current network connection between the first user device and a server associated with process 200. As a more particular example, in some embodiments, the message can indicate a current speed of the network connection, a latency associated with the network connection, a bandwidth of the network connection, a number of times the network connection has been dropped or has timed out, and/or any other suitable information indicating a quality of the network connection.

Note that, in some embodiments, process 200 can receive messages from any user devices participating in the synchronized media playback session that can indicate any suitable information. For example, in some embodiments, a message from a user device can indicate a quality of a network connection between the user device and a server associated with process 200. As another example, in some embodiments, a message from a user device can indicate information about the user device, such as a type of user device (e.g., that the user device is a mobile device, that the user device is a smart television, and/or any other suitable device type), information about a display of the user device (e.g., a size of the display, a current orientation of the display, and/or any other suitable display information), and/or any other suitable information. In some such embodiments, the information received from the user devices can be used by process 200 to determine parameters for media content streams transmitted to each user device, as described in more detail below in connection with block 206.

At 206, process 200 can select and/or generate a media content stream corresponding to the media content item that is of lower quality than the media content stream previously transmitted to the first user device. In some embodiments, the lower quality media content stream can be of reduced quality in any suitable manner. For example, in some embodiments, the lower quality media content stream can be encoded using a lower bitrate than the media content stream originally transmitted to the first user device. In some embodiments, process 200 can generate a lower quality media content stream that begins from any suitable playback position. For example, in some embodiments, process 200 can identify a playback position corresponding to a last portion of media content data of the originally transmitted media content stream and can generate a lower quality media content stream that begins subsequent to the playback position.

Note that, in some embodiments, process 200 can select and/or determine stream parameters for the lower quality media content stream using any suitable information and any suitable technique(s). For example, in some embodiments, process 200 can select and/or determine updated stream parameters (e.g., a new bitrate at which the stream is encoded, and/or any other suitable stream parameters) based on stream parameters associated with the media content stream that was previously transmitted to the first user device at block 202. As a more particular example, in some embodiments, process 200 can select an updated bitrate that is lower than the bitrate of the stream that was transmitted to the first user device at block 202. As another example, in some embodiments, process 200 can select and/or determine updated stream parameters based on information associated with the first user device. As a more particular example, in some embodiments, process 200 can select and/or determine updated stream parameters based on an amount of media content data currently stored in a buffer of the first user device and/or based on a capability of the first user device to decode frames of the media content stream prior to presentation. As another more particular example, in some embodiments, process 200 can select and/or determine updated stream parameters based on information indicating a quality of a network connection between the first user device and a server associated with process 200 (e.g., a latency associated with the connection, a bandwidth associated with the connection, a speed of the connection, and/or any other suitable information). As yet another more particular example, in some embodiments, process 200 can select and/or determine updated stream parameters based on information indicating performance of the other user devices participating in the synchronized media playback session, such as a quality of each of the other user devices network connection to a server associated with process 200 (e.g., a speed of each network connection, a latency of each network connection, a bandwidth of each network connection, and/or any other suitable information), a capability of each user device in the session to decode frames prior to presentation, an amount of data stored in a buffer of each device, and/or any other suitable performance information of devices other than the first user device.

At 208, process 200 can begin transmitting the lower quality media content stream to the first user device. In some embodiments, process 200 can notify the first user device that a lower quality media content stream is being transmitted in any suitable manner. For example, in some embodiments, process 200 can transmit an indication of a bitrate associated with the lower quality media content stream to the first user device. In some embodiments, process 200 can transmit instructions that cause a notification to be presented on the first user device indicating that a lower quality media content stream is being transmitted (e.g., the message can indicate that the first user device is receiving a lower quality media content stream due to a poor network connection, and/or any other suitable information).

At 210, process 200 can transmit instructions to each of the user devices participating in the synchronized media playback session to begin presentation of the media content item using the media content streams transmitted to each user device. For example, as described above in connection with block 124 of FIG. 1, the instructions can cause each user device to begin simultaneous presentation of the media content item. In some embodiments, as described above in connection with block 124 of FIG. 1, a media content item presented in a synchronized media playback session can include any suitable features, such as indications of other user devices participating in the session, features that allow a user device participating in the session to alter playback of the media content item (e.g., pause the media content item, jump to a different playback position, and/or alter playback in any other suitable manner) that causes the playback to be altered on all user devices in the session, and/or features that allow users of the user devices to interact with each other (e.g., via a messaging interface, and/or in any other suitable manner).

At 212, process 200 can receive, from a second user device of the multiple user devices participating in the synchronized media playback session, information indicating that the second user device has stored less media content data corresponding to the media content stream transmitted to the second user device than other user devices participating in the synchronized media playback session. In some embodiments, process 200 can receive the information from the second user device in any suitable manner. For example, in some embodiments, each user device participating in the synchronized media playback session can periodically transmit a message to a server associated with process 200 that indicates a current state of a buffer of the user device (e.g., an amount of data currently in the buffer, a playback duration of the data currently in the buffer, and/or and other suitable information indicating a state of the buffer). In some such embodiments, process 200 can determine that the second user device has less media content data stored in the buffer of the second user device than other user devices have stored in their respective buffers based on a comparison between information received from the second user device with information received from the other user devices. For example, in an instance where the second user device transmits a message indicating that the second user device currently has two seconds of playback data stored in the buffer of the second user device, and the other user devices indicate that the other user devices have substantially more data store in their respective buffers (e.g., more than eight seconds of playback data, more than ten seconds of playback data, and/or any other suitable amount), process 200 can determine that the second user device has less media content data stored in a buffer of the second user device relative to the other user devices participating in the session.

At 214, process 200 can select and/or generate a media content stream of a lower quality level than the media content stream previously transmitted to the second user device. For example, as described above in connection with block 206, process 200 can select and/or generate a media content stream that is encoded with a lower bitrate than the originally transmitted media content stream. In some embodiments, process 200 can generate a media content stream of lower quality that begins from any suitable playback position of the corresponding media content item. For example, in some embodiments, process 200 can generate a media content stream of lower quality that begins at a position subsequent to a last playback position buffered by the second user device. In some such embodiments, process 200 can determine the last playback position buffered by the second user device based on any suitable information, such as information included in a message received by a server associated with process 200 transmitted from the second user device.

Similarly to what is described above in connection with block 206, process 200 can select stream parameters of the lower quality media content stream to be transmitted to the second user device based on any suitable information or any suitable combination of information. For example, as described above, process 200 can select the stream parameters based on information associated with the second user device, such as information indicating a current amount of buffered data, information indicating a quality of a network connection between the second user device and a server associated with process 200, information about the second user device (e.g., a device type, information about a display of the second user device, and/or any other suitable information), and/or any other suitable information. As another example, in some embodiments, process 200 can select the stream parameters based on information about other user devices participating in the synchronized media playback session, such as information about a quality of network connections of each of the other user devices, an amount of data currently buffered by each of the other user devices, and/or any other suitable information. As a more particular example, in some embodiments, process 200 can determine that the lower quality stream is to be encoded at a bitrate low enough to allow the second user device to buffer an amount of media content data equal to an average (e.g., a mean, a weighted mean, a median, and/or any other suitable average) of the amount of data buffered by the other user devices participating in the session within a predetermined duration of time (e.g., within two seconds, within five seconds, and/or any other suitable duration).

At 216, process 200 can transmit the media content stream of lower quality to the second user device. In some embodiments, the second user device can then buffer the media content stream of lower quality, and can then begin presenting the lower quality media content stream from the buffer.

Note that, in some embodiments, process 200 can use any other suitable techniques to maintain synchrony among user devices participating in the synchronized media playback session. For example, in an instance where a user device participating in the synchronized media playback session pauses playback in order to buffer additional media content data, process 200 can alter a playback speed for the user device that paused playback and/or the other user devices participating in the synchronized playback session. As a more particular example, in some embodiments, process 200 can speed up playback for the user device that paused and resumed playback to buffer additional media content data, thereby allowing the user device to catch up to the other user devices in the synchronized media playback session. As another more particular example, in some embodiments, process 200 can slow down playback for the other user devices participating in the synchronized media playback session, thereby causing the other user devices to allow the user devices that paused playback to catch up in the synchronized media playback session. Note that, in some embodiments, process 200 can cause a playback speed to be altered for one or more user devices participating in the synchronized media playback session based on any suitable criteria. For example, in some embodiments, process 200 can alter a playback speed in response to determining that a user device is more than a predetermined duration of time (e.g., more than two seconds, more than five seconds, and/or any other suitable duration of time) out of synchrony with other user devices participating in the session.

Additionally, note that, in some embodiments, process 200 can use any suitable technique or combination of techniques to coordinate synchronization of an additional user device that joins an existing synchronized media playback session. For example, in some embodiments, process 200 can cause playback of a media content item to be paused on all user devices in the session while an additional user device buffers media content data to join the other user devices in synchronized playback. As another example, in some embodiments, process 200 can identify a future playback position of a media content item being presented in a synchronized media playback session (e.g., a playback position five seconds after a current playback position, a playback position ten seconds after a current playback position, and/or any other suitable future playback position) and can transmit media content data beginning at the future playback position to the additional user device for buffering on the additional (third) user device. Process 200 can then transmit instructions to the additional user device that cause the additional user device to begin playback of the media content item from the future playback position at a time at which the other user devices in the session reach the future playback position, thereby allowing the additional user device to join the synchronized session. As yet another example, in some embodiments, process 200 can begin transmitting media content data from a current playback position to the additional user device, and can subsequently estimate a future playback position at which the additional user device will have buffered a predetermined amount of media content data (e.g., a particular number of kilobytes of data, an amount of data corresponding to a particular duration of playback, and/or any other suitable amount of data) based on a buffering rate and/or network connection information of the additional user device. Process 200 can then begin transmitting media content data corresponding to the estimated future playback position to the additional user device in connection with instructions to begin presenting the media content item from the estimated future playback position.

Figure 3:
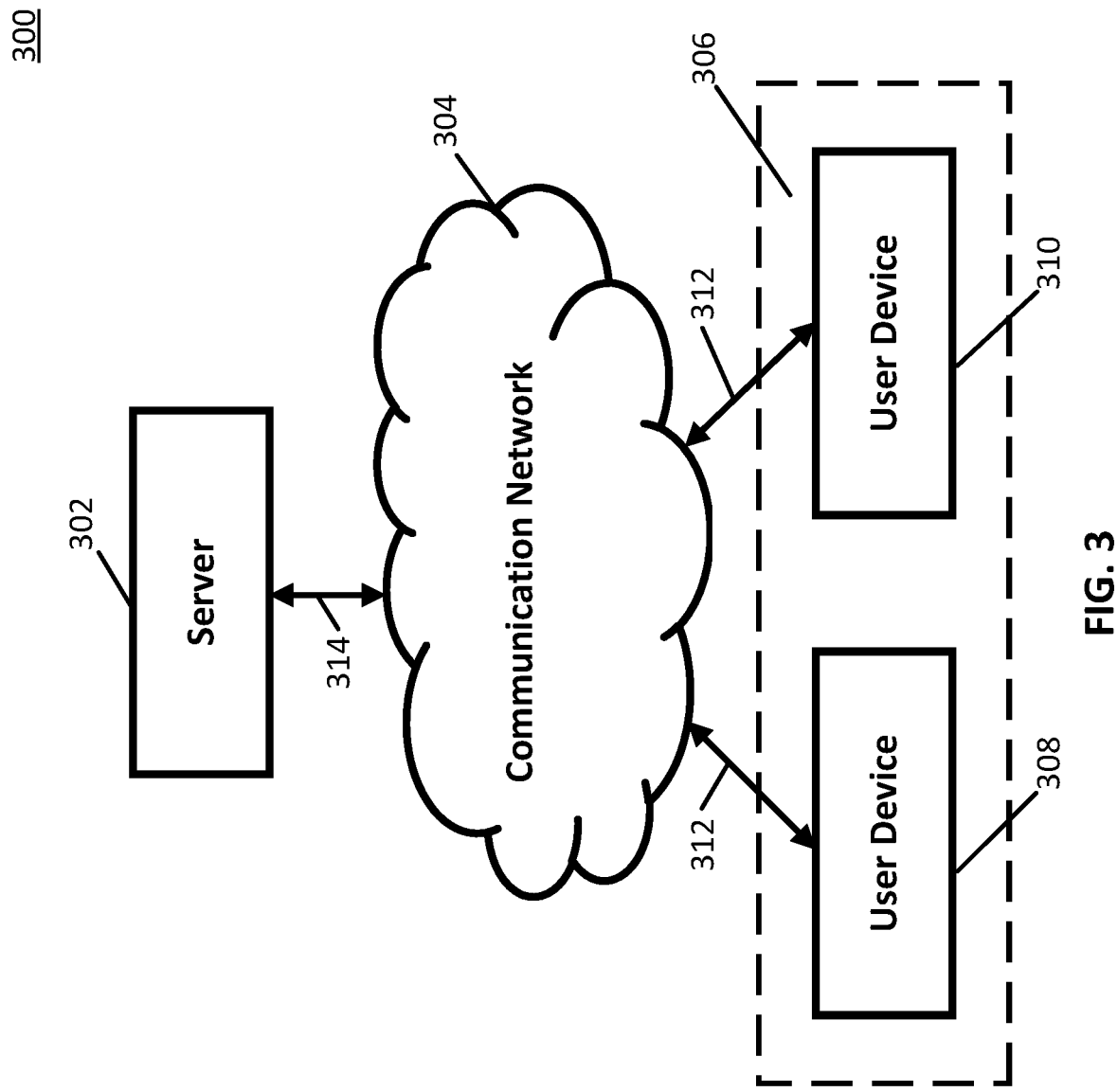
FIG. 3 shows a schematic diagram of an illustrative system suitable for implementation of mechanisms described herein for adjusting quality level during synchronized media content playback on multiple devices in accordance with some embodiments of the disclosed subject matter.

Turning to FIG. 3, an example 300 of hardware for adjusting quality level during synchronized media content playback on multiple devices that can be used in accordance with some embodiments of the disclosed subject matter is shown. As illustrated, hardware 300 can include a server 302, a communication network 304, and/or one or more user devices 306, such as user devices 308 and 310. For example, multiple user devices 306 including user devices 308 and 310 can participate in a synchronized media playback session managed by one or more servers 302 over communication network 304. In another example, server 302 can be configured to provide the media content in the synchronized media playback session to one or more user devices 306, such as user devices 308 and 310, and can also be configured to handle the synchronization features in the synchronized media playback session. In yet another example, a first server 302 can be configured to provide the media content in the synchronized media playback session to one or more user devices 306 and a second server 302 can be configured to handle the synchronized media playback session.

Server 302 can be any suitable server(s) for storing information, data, and/or media content. For example, in some embodiments, server 302 can store media content items, which can be transmitted to user devices 306 for presentation. In some such embodiments, the media content items can include any suitable types of media content, such as videos, movies, television programs, live-streamed content, audio content (e.g., music, audiobooks, radio programs, and/or any other suitable audio content), and/or any other suitable type of media content. As another example, in some embodiments, server 302 can coordinate synchronized playback of media content on multiple user devices 306, as described above in connection with FIGS. 1 and 2. As a more particular example, in some embodiments, server 302 can receive requests from multiple user devices to initiate playback of a media content item in a synchronized media playback session, and can instruct the user devices to begin playback of the media content item in response to determining that all of the user devices have buffered a predetermined amount of media content data, as described above in connection with FIG. 2.

Communication network 304 can be any suitable combination of one or more wired and/or wireless networks in some embodiments. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links (e.g., communications links 312) to communication network 304 that can be linked via one or more communications links (e.g., communications links 314) to server 302. The communications links can be any communications links suitable for communicating data among user devices 306 and server 302 such as network links, dial-up links, wireless links, hard-wired links, any other suitable communications links, or any suitable combination of such links.

User devices 306 can include any one or more user devices suitable for presenting media content and/or participating in a synchronized media playback session. For example, in some embodiments, user devices 306 can include a mobile phone, a tablet computer, a smart television, a media player, a desktop computer, a vehicle entertainment system, a wearable computer, and/or any other suitable type of user device.

Although server 302 is illustrated as one device, the functions performed by server 302 can be performed using any suitable number of devices in some embodiments. For example, in some embodiments, multiple devices can be used to implement the functions performed by server 302.

Although two user devices 308 and 310 are shown in FIG. 3 to avoid over-complicating the figure, any suitable number of user devices, and/or any suitable types of user devices, can be used in some embodiments.

Figure 4:
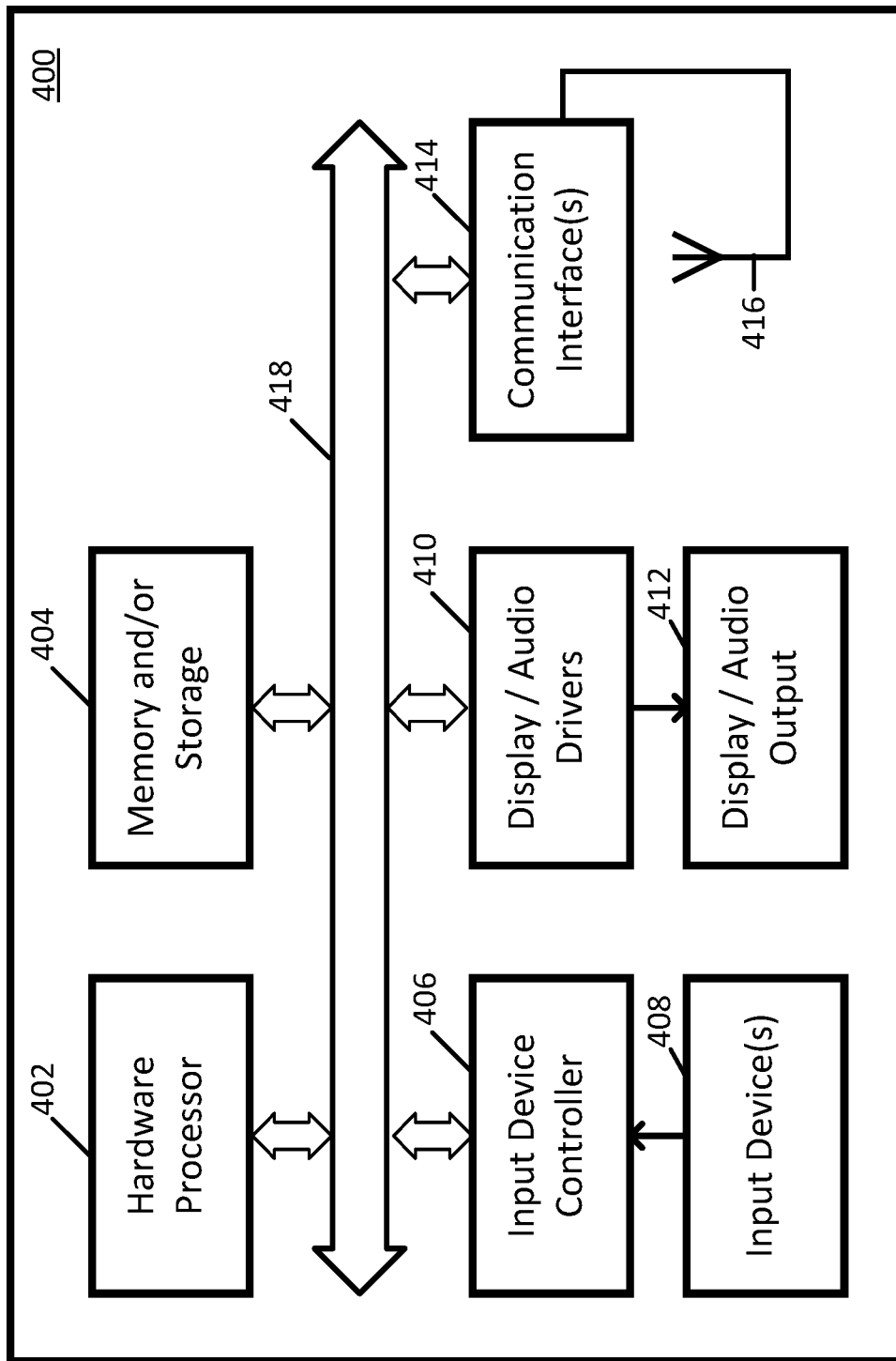
FIG. 4 shows a detailed example of hardware that can be used in a server and/or a user device of FIG. 3 in accordance with some embodiments of the disclosed subject matter.

Server 302 and user devices 306 can be implemented using any suitable hardware in some embodiments. For example, in some embodiments, devices 302 and 306 can be implemented using any suitable general purpose computer or special purpose computer. For example, a mobile phone may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 402 can be controlled by a server program stored in memory and/or storage of a server, such as server 402. For example, in some embodiments, the server program can cause hardware processor 402 to receive a request to coordinate a synchronized media content viewing session, determine whether multiple user devices are ready to begin the synchronized media content viewing session, transmit instructions to user devices to begin a synchronized media content viewing session, adjust a quality of a stream of media content, and/or perform any other suitable functions. In some embodiments, hardware processor 402 can be controlled by a computer program stored in memory and/or storage 404 of user device 306. For example, the computer program can cause hardware processor 402 to store received media content data in a buffer of user device 306, transmit a message to server 302 in response to determining that a predetermined amount media content data has been buffered, present media content as part of a synchronized media content playback session, transmit a message to server 302 indicating a current state of a buffer of user device 306 and/or a current quality of a network connection, and/or perform any other suitable functions.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks (e.g., computer network 304). For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above described blocks of the processes of FIGS. 1 and 2 can be executed or performed in any order or sequence not limited to the order and sequence shown in and described in connection with the figures. Also, some of the above blocks of FIGS. 1 and 2 can be executed or performed substantially simultaneously where appropriate or in parallel to reduce latency and processing times. Additionally or alternatively, some of the above described blocks of the processes of FIGS. 1 and 2 can be omitted. For example, a method as described with reference to blocks 212, 214 and 216 of FIG. 3 could in principle be applied in the case of a synchronized media playback session which had not been initiated as described with reference to blocks 202 to 210 of FIG. 3.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for adjusting quality level during synchronized media content presentation are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for synchronizing playback of media content, the method comprising:
   receiving, by a server, requests for synchronized media content playback of a media content item on a first device and a second device;
   in response to receiving the requests for synchronized media content playback of the media content item from the first device and the second device, transmitting, from the server to the first device, first media content data corresponding to a first stream of the media content item and, from the server to the second device, second media content data corresponding to a second stream of the media content item, wherein the first media content data is to be stored in a first device memory, and wherein the second media content data is to be stored in a second device memory; and
   maintaining, by the server, the synchronized media content playback of the media content item on the first device and the second device by transmitting a third stream of the media content item at a different quality level than the first stream of the media content item to the first device based on rates at which the first media content data is being stored in the first device memory and the second media content data is being stored in the second device memory, wherein the media content item is presented on the first device and the second device concurrently with an interface for presenting messages between users of the first device and the second device.

2. The method of claim 1, wherein the method further comprises transmitting, from the server to the first device and to the second device, instructions that cause the first device and the second device to begin presenting the media content item simultaneously.

3. The method of claim 2, wherein the instructions that cause the first device and the second device to begin presenting the media content item simultaneously are based on a determination that the first device and the second device have stored a predetermined amount of the media content data corresponding to the media content item.

4. The method of claim 1, wherein maintaining the synchronized media content playback of the media content item on the first device and the second device further comprises selecting the third stream of the media content item corresponding to the first stream of the media content item.

5. The method of claim 1, wherein the method further comprises determining that the first media content data is being stored in the first device memory at a slower rate than the second media content data is being stored in the second device memory based on a message, from the first device, that indicates a current amount of the first media content data stored in the first device memory at a time at which the message is transmitted to the server by the first device.

6. The method of claim 1, wherein the method further comprises determining that the first media content data is being stored in the first device memory at a slower rate than the second media content data is being stored in the second device memory based on a comparison of an amount of the first media content data stored in the first device memory and an amount of the second media content data stored in the second device memory.

7. The method of claim 1, wherein the third stream of the media content item has a lower bitrate than the first stream of the media content item.

8. A system for synchronizing playback of media content, the system comprising: a hardware processor that is configured to:
receive, by a server, requests for synchronized media content playback of a media content item on a first device and a second device;
in response to receiving the requests for synchronized media content playback of the media content item from the first device and the second device, transmit, from the server to the first device, first media content data corresponding to a first stream of the media content item and, from the server to the second device, second media content data corresponding to a second stream of the media content item, wherein the first media content data is to be stored in a first device memory, and wherein the second media content data is to be stored in a second device memory; and
maintain, by the server, the synchronized media content playback of the media content item on the first device and the second device by transmitting a third stream of the media content item at a different quality level than the first stream of the media content item to the first device based on rates at which the first media content data is being stored in the first device memory and the second media content data is being stored in the second device memory, wherein the media content item is presented on the first device and the second device concurrently with an interface for presenting messages between users of the first device and the second device.

9. The system of claim 8, wherein the hardware processor is further configured to transmit, from the server to the first device and to the second device, instructions that cause the first device and the second device to begin presenting the media content item simultaneously.

10. The system of claim 9, wherein the instructions that cause the first device and the second device to begin presenting the media content item simultaneously are based on a determination that the first device and the second device have stored a predetermined amount of the media content data corresponding to the media content item.

11. The system of claim 8, wherein maintaining the synchronized media content playback of the media content item on the first device and the second device further comprises selecting the third stream of the media content item corresponding to the first stream of the media content item.

12. The system of claim 8, wherein the hardware processor is further configured to determine that the first media content data is being stored in the first device memory at a slower rate than the second media content data is being stored in the second device memory based on a message, from the first device, that indicates a current amount of the first media content data stored in the first device memory at a time at which the message is transmitted to the server by the first device.

13. The system of claim 8, wherein the hardware processor is further configured to determine that the first media content data is being stored in the first device memory at a slower rate than the second media content data is being stored in the second device memory based on a comparison of an amount of the first media content data stored in the first device memory and an amount of the second media content data stored in the second device memory.

14. The system of claim 8, wherein the third stream of the media content item has a lower bitrate than the first stream of the media content item.

15. A non-transitory computer-readable medium containing computer executable instructions that, when executed by a processor on a server, cause the processor to perform a method for synchronizing playback of media content, the method comprising:
receiving, by the server, requests for synchronized media content playback of a media content item on a first device and a second device;
in response to receiving the requests for synchronized media content playback of the media content item from the first device and the second device, transmitting, from the server to the first device, first media content data corresponding to a first stream of the media content item and, from the server to the second device, second media content data corresponding to a second stream of the media content item, wherein the first media content data is to be stored in a first device memory, and wherein the second media content data is to be stored in a second device memory; and
maintaining, by the server, the synchronized media content playback of the media content item on the first device and the second device by transmitting a third stream of the media content item at a different quality level than the first stream of the media content item to the first device based on rates at which the first media content data is being stored in the first device memory and the second media content data is being stored in the second device memory, wherein the media content item is presented on the first device and the second device concurrently with an interface for presenting messages between users of the first device and the second device.

16. The non-transitory computer-readable medium of claim 15, wherein the method further comprises transmitting, from the server to the first device and to the second device, instructions that cause the first device and the second device to begin presenting the media content item simultaneously.

17. The non-transitory computer-readable medium of claim 16, wherein the instructions that cause the first device and the second device to begin presenting the media content item simultaneously are based on a determination that the first device and the second device have stored a predetermined amount of the media content data corresponding to the media content item.

18. The non-transitory computer-readable medium of claim 15, wherein maintaining the synchronized media content playback of the media content item on the first device and the second device further comprises selecting the third stream of the media content item corresponding to the first stream of the media content item.

19. The non-transitory computer-readable medium of claim 15, wherein the method further comprises determining that the first media content data is being stored in the first device memory at a slower rate than the second media content data is being stored in the second device memory based on a message, from the first device, that indicates a current amount of the first media content data stored in the first device memory at a time at which the message is transmitted to the server by the first device.

20. The non-transitory computer-readable medium of claim 15, wherein the method further comprises determining that the first media content data is being stored in the first device memory at a slower rate than the second media content data is being stored in the second device memory based on a comparison of an amount of the first media content data stored in the first device memory and an amount of the second media content data stored in the second device memory.

21. The non-transitory computer-readable medium of claim 15, wherein the third stream of the media content item has a lower bitrate than the first stream of the media content item.

* * * * *